J. D. CONYNE.
Harvester Dropper.
No. 40,676.
Patented Nov. 24, 1863.
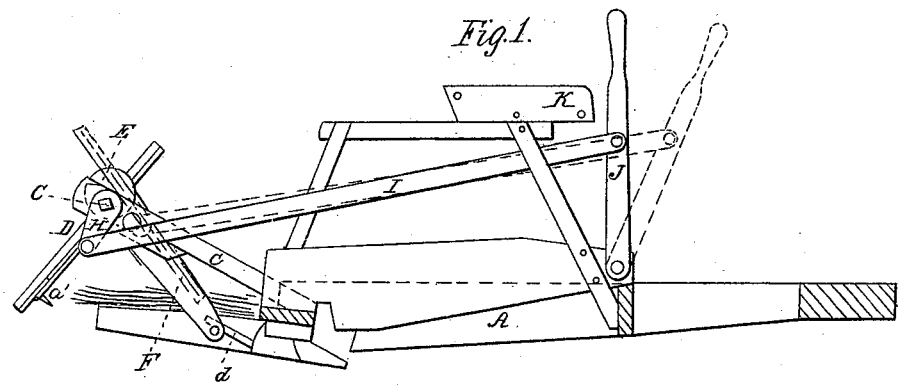
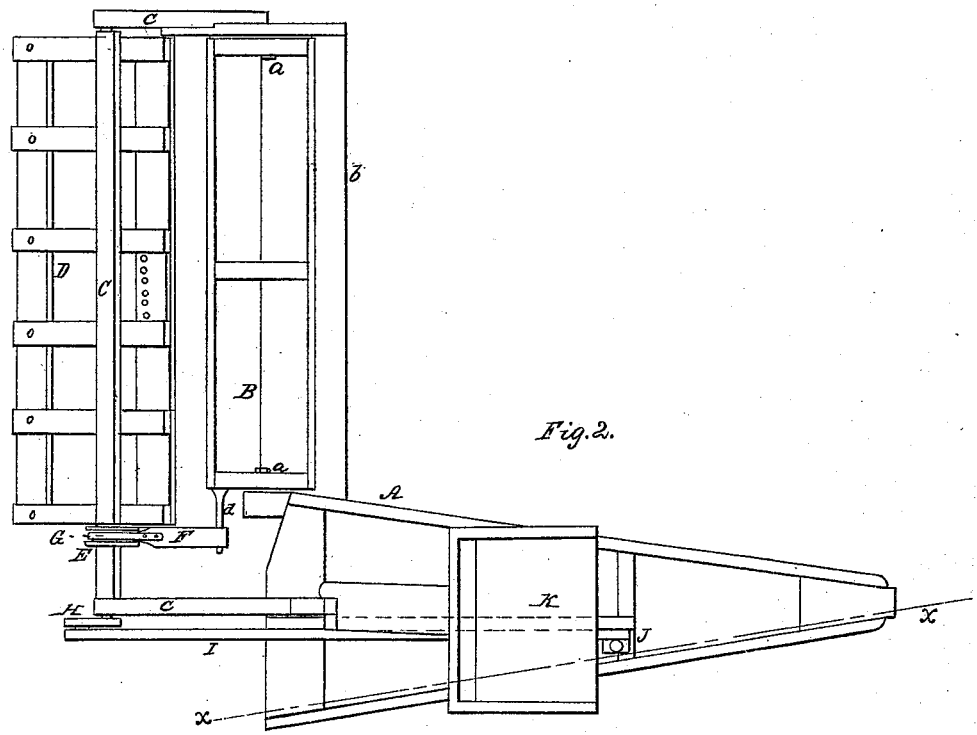

UNITED STATES PATENT OFFICE.

J. D. CONYNE, OF LYNDON, ILLINOIS.

IMPROVEMENT IN GRAIN-DISCHARGERS FOR HARVESTERS.

Specification forming part of Letters Patent No. 40,676, dated November 24, 1863.

*To all whom it may concern:*

Be it known that I, J. D. CONYNE, of Lyndon, in the county of Whiteside and State of Illinois, have invented a new and useful Grain-Discharging Device for Harvesters; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

The object of this invention is to obtain a simple and efficient device for discharging as it is cut the grain from harvesters, and one which may be applied to the generality of harvesters in use.

To this end the invention consists in the employment or use of a tilting trough and a revolving platform applied to the harvester, to operate as hereinafter fully set forth.

To enable those skilled in the art to fully understand and construct my invention, I will proceed to describe it.

A represents the main frame of a harvester or reaper—such, for instance, as are used with the McCormick reaper—and B is a trough, of V form in its transverse section, and suspended on pivots $a\ a$ in the frame A, directly behind the finger-bar $b$.

To the frame A there are attached two oblique bars, $c\ c$, in which are the bearings of a shaft, C, said shaft having attached to it a platform, D, which is a plane formed of planks or boards, or formed of a frame covered with a suitable canvas. This platform is attached to the shaft C, the latter extending longitudinally along at one side of the center of the platform, which platform is directly behind and a little above the level of the trough B.

On the shaft C there is placed an eccentric, E, to which a rod, F, is attached by a strap, G. This rod F is connected at its lower end to a pin, $d$, at one end of the trough B. At one end of the shaft C there is a crank, H, to which a rod, I, is attached, the front end of said rod being connected to a lever, J, which is directly in front of the driver's seat K.

The operation is as follows: When the harvester is being drawn along and the cut grain falls upon the platform D the latter is in an inclined position, as is indicated in red in Fig. 1. The butts of the grain or straw as the grain reaches the platform pass into the trough B, the body or main portion of the grain resting or bearing upon the platform. When a sufficient quantity of grain is upon the platform and in the trough B the driver draws back the upper end of the lever J, and thereby forces backward the lower end of the platform and causes it to make a complete revolution, and as the platform is thus moved the trough B is tilted through the medium of the eccentric E and rod F, so that its back end will fall or be depressed, and the grain is thereby discharged at the rear of the reaper, as shown in blue, the trough assuming its original position as the platform arrives to its former inclined position to receive the grain.

This device has been practically tested, and has been found to answer an admirable purpose.

I would remark that the lower end of the platform D is provided with teeth $a'$ to prevent the grain from slipping laterally on the platform.

Having thus described my invention, what I claim as new, and desire to secure by Letters Patent, is—

The revolving platform D, in combination with the tilting trough B, arranged and applied to a harvester substantially as and for the purpose herein set forth.

J. D. CONYNE.

Witnesses:
   ORANGE WOODRUFF,
   BENJAMIN F. BESS.